US008644294B2

(12) United States Patent
Hole et al.

(10) Patent No.: US 8,644,294 B2
(45) Date of Patent: Feb. 4, 2014

(54) METHODS AND APPARATUS TO USE WINDOW ALIGNMENT INFORMATION TO PROCESS ACKNOWLEDGMENT INFORMATION ASSOCIATED WITH TRANSMITTED DATA BLOCKS

(75) Inventors: David Philip Hole, Southampton (GB); Dennis Conway, Mississauga (CA)

(73) Assignee: BlackBerry Limited, Waterloo (CA)

( * ) Notice: Subject to any disclaimer, the term of this patent is extended or adjusted under 35 U.S.C. 154(b) by 706 days.

(21) Appl. No.: 12/764,653

(22) Filed: Apr. 21, 2010

(65) Prior Publication Data

US 2011/0103306 A1  May 5, 2011

Related U.S. Application Data

(60) Provisional application No. 61/171,335, filed on Apr. 21, 2009.

(51) Int. Cl.
*H04J 3/06* (2006.01)

(52) U.S. Cl.
USPC .......................................................... 370/350

(58) Field of Classification Search
USPC ................................................. 370/310–350
See application file for complete search history.

(56) References Cited

U.S. PATENT DOCUMENTS

| | | | |
|---|---|---|---|
| 2003/0217318 A1 | 11/2003 | Choi | |
| 2004/0081248 A1* | 4/2004 | Parolari | ......................... 375/259 |
| 2008/0056303 A1 | 3/2008 | Sebire et al. | |
| 2008/0126810 A1 | 5/2008 | Chiu | |
| 2009/0086685 A1 | 4/2009 | Aghili et al. | |
| 2009/0137252 A1 | 5/2009 | Masseroni et al. | |
| 2010/0284338 A1* | 11/2010 | Persson et al. | ................. 370/328 |

FOREIGN PATENT DOCUMENTS

| | | | |
|---|---|---|---|
| CN | 101242243 | 8/2008 | |
| WO | 2008126810 | 10/2008 | |
| WO | WO2009088348 A1 * | 7/2009 | ................ H04L 1/18 |

OTHER PUBLICATIONS

3rd Generation Partnership Project, "3GPP TS 44.060 Technical Specification," Version 8.4.0, Feb. 2009, 589 pages.
International Searching Authority, "International Search Report," issued in connection with international application serial No. PCT/CA2010/000560, mailed Jul. 27, 2010, 3 pages.
International Searching Authority, "Written Opinion of the International Searching Authority," issued in connection with international application serial No. PCT/CA2010/000560, mailed Jul. 27, 2010, 5 pages.
Patent Cooperation Treaty, "International Preliminary Report on Patentability," issued in connection with corresponding PCT Application No. PCT/CA2010/000560 on Oct. 25, 2011 (6 pages).

(Continued)

*Primary Examiner* — Ricky Ngo
*Assistant Examiner* — Wei-Po Kao
(74) *Attorney, Agent, or Firm* — Hanley, Flight & Zimmerman, LLC

(57) ABSTRACT

Methods and apparatus to use window alignment information to process acknowledgment information associated with transmitted data blocks are disclosed. An example method disclosed herein comprises receiving acknowledgment information piggy-backed with data when a first previously transmitted block is associated with at least one of a tentative acknowledgment state or a pending acknowledgment state, and advancing a transmit window when the acknowledgment information indicates that all previously transmitted data blocks including the first previously transmitted block have been positively acknowledged.

18 Claims, 9 Drawing Sheets

(56) References Cited

OTHER PUBLICATIONS

Figure 1:
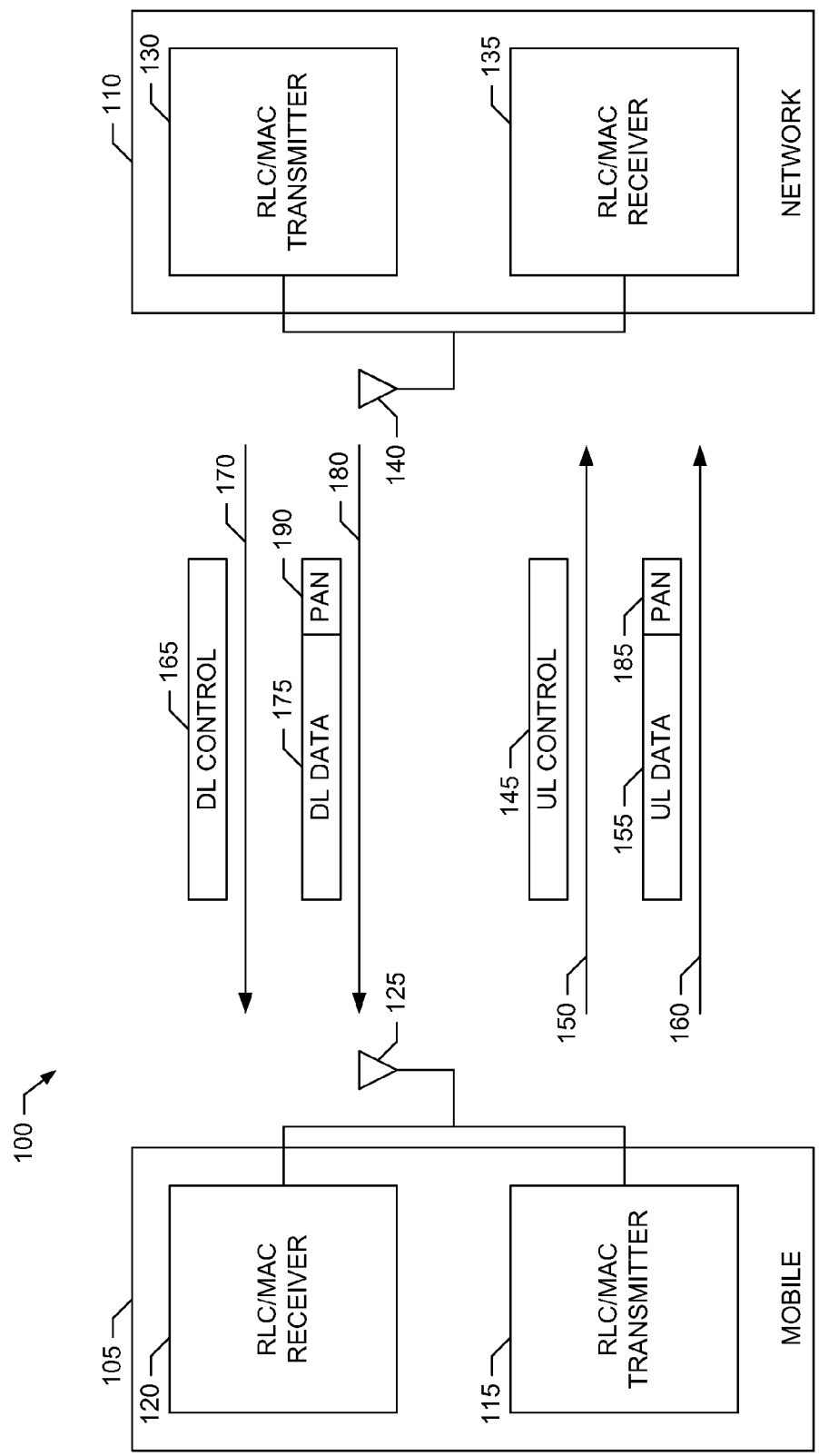

European Patent Office, "Extended European Search Report," issued in connection with European Patent Application No. 10160596.2, issued on Feb. 2, 2011, (10 pages).

Office Action, issued by the Canadian Intellectual Property Office in connection with Canadian patent application No. 2,759,675, on Jul. 25, 2013, 3 pages.

Canadian Office Action, issued by the Canadian Intellectual Property Office in connection with Canadian Patent Application No. 2,769,675 on Jul. 25, 2013, 3 pages.

State Intellectual Property Office of China, "First Office Action," issued in connection with corresponding Chinese Patent Application No. 201080017509.7, dated Oct. 23, 2013 (16 pages).

* cited by examiner

METHODS AND APPARATUS TO USE WINDOW ALIGNMENT INFORMATION TO PROCESS ACKNOWLEDGMENT INFORMATION ASSOCIATED WITH TRANSMITTED DATA BLOCKS

RELATED APPLICATION

This patent claims priority from U.S. Provisional Application Ser. No. 61/171,335, entitled "Methods and Apparatus to Use Window Alignment Information to Process Acknowledgment Information Associated with Transmitted Data Blocks" and filed on Apr. 21, 2009. U.S. Provisional Application Ser. No. 61/171,335 is hereby incorporated by reference in its entirety.

FIELD OF THE DISCLOSURE

This disclosure relates generally to data transmission techniques and, more particularly, to methods and apparatus to use window alignment information to process acknowledgment information associated with transmitted data blocks.

BACKGROUND

Many communications systems employ automatic repeat request (ARQ) techniques that allow a transmitter to confirm that data transmissions have been received successfully by an intended receiver. A typical ARQ technique involves the receiver sending acknowledgment information for each received data block, with the acknowledgment information identifying the data block being acknowledged. The acknowledgment information may include a positive acknowledgment (referred to herein as an "ACK") indicating that reception of the data block was successful, a negative acknowledgment (referred to herein as a "NACK") indicating that reception of the data block was unsuccessful, as well as any other appropriate acknowledgment information. For example, in an enhanced general packet radio service (EGPRS) communication system, a receiver can acknowledge receipt of radio link control (RLC) data blocks using RLC/MAC control messages (where MAC refers to medium access control), such as an EGPRS packet downlink ACK/NACK control message or a packet uplink ACK/NACK control message.

In the case of a bidirectional communications system, such as an EGPRS system, the latency associated with using separate control messages to send acknowledgment information can be reduced by including such acknowledgment information with data blocks to be transmitted in the opposite direction. For example, EGPRS supports such latency reduction through its fast ACK/NACK reporting (FANR) feature. The FANR feature allows acknowledgment information to be piggy-backed with an RLC/MAC data block sent from a receiving unit to a transmitting unit through use of a piggy-backed ACK/NACK (PAN) field. However, acknowledgment information received via a PAN field is generally less reliable than acknowledgment information received via a separate packet ACK/NACK control message. As such, a data block associated with an ACK in a received PAN field is treated by the transmitter as being only tentatively acknowledged and, thus, is associated with a tentatively acknowledged state (referred to herein as a "TENTATIVE_ACK" state) until confirmed via an appropriate ACK/NACK control message. Accordingly, under certain circumstance, an EGPRS transmitter may be required to resend blocks associated with a TENTATIVE_ACK state until the appropriate ACK/NACK control message confirmation is received, even though the blocks are likely to have been already received by the receiver.

BRIEF DESCRIPTION OF THE DRAWINGS

FIG. 1 is a block diagram of an example EGPRS communication system capable of supporting the methods and apparatus described herein.

FIG. 2 illustrates a first example transmit and receive window alignment scenario that may be used to process acknowledgment information associated with transmitted data blocks in the example EGPRS communication system of FIG. 1.

FIG. 3 illustrates a second example transmit and receive window alignment scenario that may be used to process acknowledgment information associated with transmitted data blocks in the example EGPRS communication system of FIG. 1.

FIG. 4 is a block diagram of an example mobile station employing window alignment information to process acknowledgment information associated with transmitted data blocks that may be used in the example EGPRS communication system of FIG. 1.

FIG. 5 is a block diagram of an example acknowledgment data field decoder that may be used to implement the example mobile station of FIG. 4.

FIG. 6 is a flowchart representative of an example process that may be performed to confirm acknowledgment information using window alignment information in the example mobile station of FIG. 4.

FIG. 7 is a flowchart representative of a second example process that may be performed to implement transmission processing using window alignment information in the example mobile station of FIG. 4.

FIG. 8 is a flowchart representative of an example process that may be performed to carry out window alignment detection to implement the example processes of FIG. 6 or 7, or both.

FIG. 9 is a block diagram of an example processing system that may store and execute example machine readable instructions used to implement some or all of the processes of FIG. 6, 7, or 8, or any combination thereof, to implement the example mobile station of FIG. 4 or the example EGPRS communication system of FIG. 1, or both.

DETAILED DESCRIPTION

Methods and apparatus to use window alignment information to process acknowledgment information associated with transmitted data blocks are disclosed herein. A first example technique described herein to determine an acknowledgment status of a previously transmitted data block using window alignment information involves a mobile station receiving a set of acknowledgment data from a network element corresponding to a receive data window maintained by the network element, wherein a positive acknowledgment indication included in the received set of acknowledgment data is considered by the mobile station as being only a tentative acknowledgment indication requiring subsequent confirmation. The first example technique also involves the mobile station determining whether the receive data window corresponding to the received set of acknowledgment data is aligned with a transmit data window maintained by the mobile station. For example, the receive data window and the transmit data window are considered aligned (e.g., possibly with a relative offset) when the start of the receive data window (e.g., representing the next data block expected to be received from the mobile station) corresponds to the next new data block expected to be transmitted by the mobile station. Furthermore, when the receive data window is determined to be aligned with the transmit data window and the set of acknowledgment data indicates that no subsequent data blocks have been received by the network element, the first example technique involves the mobile station at least one of: (1) confirming that a first transmitted data block included in the transmit window and associated with only a tentatively acknowledged state has been positively acknowledged by the network element or (2) skipping retransmission of such a first transmitted data block.

A second example technique described herein to use window alignment information and acknowledgment information to prioritize mobile station transmissions involves the mobile station receiving a set of uplink acknowledgment data from a network element corresponding to a receive data window maintained by the network element, wherein a positive acknowledgment indication included in the received set of uplink acknowledgment data is considered by the mobile station as being only a tentative acknowledgment indication requiring subsequent confirmation. The second technique also involves the mobile station receiving a poll from the network element requesting a set of downlink acknowledgment data to be transmitted by the mobile station with a subsequent data block destined for the network element. Additionally, the second example technique involves the mobile station determining whether the receive data window corresponding to the received set of acknowledgment data is aligned with a transmit data window maintained by the mobile station. For example, the receive data window and the transmit data window are considered aligned (e.g., possibly with a relative offset) when the start of the receive data window (e.g., representing the next data block expected to be received from the mobile station) corresponds to the next new data block expected to be transmitted by the mobile station. Furthermore, when the receive data window is determined to be aligned with the transmit data window and the set of acknowledgment uplink data indicates that no subsequent data blocks have been received by the receiver, and when the subsequent data block to be transmitted by the transmitter is associated with a tentative acknowledgment state, the second example technique involves the mobile station transmitting a separate control message including at least the requested set of downlink acknowledgment data instead of transmitting the requested set of downlink acknowledgment data along with the subsequent data block.

As described in greater detail below, in a particular example implementation of either of the preceding techniques, the mobile station and the network may support the EGPRS FANR feature. In such an example implementation, the set of acknowledgment data is provided by the network element to the mobile station by way of a PAN field. Furthermore, a poll from the network requesting that acknowledgment information be transmitted by the mobile station along with a subsequent data block corresponds to a poll requesting that a PAN field be transmitted with an uplink RLC/MAC data block destined for the network. Additionally, in such an example implementation, the separate control message including at least the requested acknowledgment information corresponds to an EGPRS packet downlink ACK/NACK control message.

Because PAN fields are used to provide acknowledgment information, the mobile station in such an example stores the acknowledgment information in an acknowledgment state array (also referred to herein as an acknowledge state array). Each element of the acknowledgment state array stores an acknowledgment state associated with a respective data block transmitted to the network within a transmit window. The acknowledgment state corresponds to at least one of an acknowledged state, an unacknowledged state, a pending acknowledgment state, a tentatively acknowledged state, an invalid state, etc. As described in greater detail below, the tentative acknowledgment state indicates that a particular data block was transmitted previously to the network and the network acknowledged receipt of the particular data block. However, the network employed an acknowledgment technique (e.g., such as the FANR technique in which a PAN field is included with the transmission of a downlink RLC/MAC data block to the mobile station) requiring further confirmation from the network element to determine that the particular data block was successfully received by the network (e.g., to thereby avoid the possibility that the window may become stalled).

As described in greater detail below, the example methods and apparatus described herein provide substantial benefits over existing techniques for processing acknowledgment information. For example, as mentioned above, the FANR feature in EGPRS allows acknowledgment information to be piggy-backed with an RLC/MAC data block through use of a PAN field. However, acknowledgment information received via a PAN field can be less reliable than acknowledgment information received via a separate EGPRS packet downlink ACK/NACK control message or packet uplink ACK/NACK control message. As such, a data block associated with an ACK in a received PAN field is treated by the transmitter as being only tentatively acknowledged and, thus, is associated with a TENTATIVE_ACK state until confirmed via an appropriate ACK/NACK control message. Furthermore, until such confirmation is received, the transmitter cannot move its associated transmit window past a block with a TENTATIVE_ACK state. Accordingly, under certain circumstance, a conventional EGPRS transmitter may be required to resend blocks associated with a TENTATIVE_ACK state, even though the blocks are likely to have been received by the receiver, until such confirmation is received. However, at least some of the example techniques described herein allow blocks associated with a TENTATIVE_ACK state to be confirmed as being positively acknowledged without requiring use of a separate ACK/NACK control message. Additionally or alternatively, at least some of the example techniques described herein allow retransmission of such TENTATIVE_ACK blocks to be skipped, thereby potentially reducing processing loads at the mobile station or network element, or both.

Additionally, in an EGPRS implementation, when a mobile station is polled to provide acknowledgment information for received downlink RLC/MAC data blocks in a PAN field accompanying a subsequent uplink RLC/MAC data block, but the mobile station has no uplink RLC/MAC data blocks to send, the mobile station can respond to the poll with a separate packet downlink ACK/NACK control message. However, even if the only remaining block to transmit is a block having a TENTATIVE_ACK state, a conventional mobile station is required to resend this TENTATIVE_ACK block with an accompanying PAN field in response to the poll, even though the TENTATIVE_ACK block has likely been already received by the network.

Unlike a conventional implementation, at least some of the example techniques described herein allow the mobile station to skip the resending of a TENTATIVE_ACK block and, instead, send the packet downlink ACK/NACK control message to the network in response to a poll for PAN when the mobile station has only uplink RLC/MAC blocks associated with a TENTATIVE_ACK state remaining to be resent to the network. By not requiring retransmission of these TENTATIVE_ACK blocks in this case, the mobile station can send the packet downlink ACK/NACK control message to the network, which can provide more acknowledgment information than a PAN and which can confirm acknowledgment of any previous downlink RLC/MAC blocks sent to the mobile station, thereby allowing the network to advance its transmit window. In contrast, a conventional implementation would require that the mobile station send a PAN with a retransmitted TENTATIVE_ACK block, even though sending such a PAN provides less acknowledgment information than a packet downlink ACK/NACK control message and does not allow the network to advance its transmit window.

Turning to the figures, a block diagram of an example EGPRS communication system 100 capable of supporting the mobile station acknowledgment information processing described herein is illustrated in FIG. 1. The EGPRS system 100 includes a mobile station 105 in communication with a network element 110. The example mobile station 105 may be implemented by any type of mobile station or user endpoint equipment, such as a mobile telephone device, a fixed telephone device, a personal digital assistant (PDA), etc. The example network element 110 may be implemented by any type of network communication device, such as a base station system, a radio access network, etc. Although only one mobile station 105 and one network element 110 are illustrated in FIG. 1, the EGPRS system 100 can support any number of mobile stations 105 and network elements 110.

The mobile station 105 of the illustrated example includes an RLC/MAC transmitter 115 and an RLC/MAC receiver 120, each communicatively coupled to an antenna 125. Similarly, the network element 110 of the illustrated example includes an RLC/MAC transmitter 130 and an RLC/MAC receiver 135, each communicatively coupled to an antenna 140. The example RLC/MAC transmitter 115 included in the mobile station 105 sends uplink RLC and MAC information wirelessly via the example antenna 125 for reception via the example antenna 140 by the example RLC/MAC receiver 135 included in the network element 110. As illustrated in FIG. 1, the uplink RLC and MAC information transmitted by the RLC/MAC transmitter 115 to the RLC/MAC receiver 135 includes uplink (designated as "UL" in the figures) RLC/MAC control messages 145 (e.g., such as EGPRS packet downlink ACK/NACK control messages 145 discussed in greater detail below) transmitted via corresponding uplink physical control channels 150, or uplink RLC/MAC data blocks 155 transmitted via corresponding uplink physical data channels 160. As described in greater detail below, the mobile station 105 determines whether a receive data window maintained by the network element's RLC/MAC receiver 135 is aligned with a transmit data window maintained by the mobile station's RLC/MAC transmitter 115. The mobile station 105 then uses the determined window alignment information to confirm that previously transmitted uplink RLC/MAC data blocks 155 were received successfully by the network element's RLC/MAC receiver 135, or to skip transmission of certain uplink RLC/MAC data blocks 155, or both.

Referring again to FIG. 1, the example RLC/MAC transmitter 130 included in the network element 110 sends downlink RLC and MAC information wirelessly via the antenna 140 for reception via the antenna 125 by the example RLC/MAC receiver 120 included in the mobile station 105. As illustrated in FIG. 1, the downlink RLC and MAC information transmitted by the RLC/MAC transmitter 130 to the RLC/MAC receiver 120 includes downlink (designated as "DL" in the figures) RLC/MAC control messages 165 (e.g., such as packet uplink ACK/NACK control messages 165 discussed in greater detail below) transmitted via corresponding downlink physical control channels 170, or downlink RLC/MAC data blocks 175 transmitted via corresponding downlink physical data channels 180.

The EGPRS system 100 implements various ARQ techniques to confirm that a transmitted RLC/MAC data block is received successfully by its intended recipient. Accordingly, to acknowledge downlink transmissions, one of the uplink RLC/MAC control messages 145 capable of being sent by the mobile station's RLC/MAC transmitter 115 is an EGPRS packet downlink ACK/NACK control message 145 providing ACK indications for downlink RLC/MAC data blocks 175 received successfully by the mobile station's RLC/MAC receiver 120. Additionally, the EGPRS packet downlink ACK/NACK control message 145 sent by the mobile station's RLC/MAC transmitter 115 provides NACK indications for downlink RLC/MAC data blocks 175 not received successfully by the mobile station's RLC/MAC receiver 120.

Similarly, to acknowledge uplink transmissions, one of the downlink RLC/MAC control messages 165 capable of being sent by the network element's RLC/MAC transmitter 130 is a packet uplink ACK/NACK control message 165 providing ACK indications for uplink RLC/MAC data blocks 155 received successfully by the network element's RLC/MAC receiver 135. Additionally, the packet uplink ACK/NACK control message 165 sent by the network element's RLC/MAC transmitter 130 provides NACK indications for uplink RLC/MAC data blocks 155 not received successfully by the network element's RLC/MAC receiver 135.

Additionally, the EGPRS system 100 implements the FANR feature to provide acknowledgment information with reduced latency. Without FANR, all acknowledgements of received RLC/MAC data blocks are sent using control messages, such as EGPRS packet downlink ACK/NACK control messages 145, packet uplink ACK/NACK control messages 165, etc. Such control messages do not include any RLC data, although they may include other RLC/MAC control information besides acknowledgement information. The disadvantage of using only control messages to send acknowledgment information is that such an approach can be quite inefficient, particularly when acknowledgement information needs to be sent quickly (e.g. in order to allow fast retransmissions of erroneously received blocks) or when the status of very few blocks needs to be indicated (e.g. in low bandwidth transmissions). In such scenarios, the amount of acknowledgement information that is actually useful is very small compared to the capacity of an RLC/MAC control message.

To reduce latency, the FANR feature allows acknowledgment information to be transmitted in a PAN field included with the transmission of an RLC/MAC data block. In the illustrated example of FIG. 1, acknowledgment information for reception of the downlink RLC/MAC data blocks 175 is included in a PAN field 185 transmitted with the corresponding uplink RLC/MAC data block 155. Similarly, acknowledgment information for reception of the uplink RLC/MAC data blocks 155 is included in a PAN field 190 transmitted with the corresponding downlink RLC/MAC data block 175. As specified by the EGPRS standards, the uplink PAN field 185 includes a reported bitmap (RB) field providing a set of acknowledgment bits, with each bit providing an ACK or NACK indication for a respective received data block being acknowledged by the RB. The uplink PAN field 185 also includes a starting sequence number (SSN) related to the block sequence number of the data block corresponding to the first data block included in the set of data blocks covered by the RB field (according to the EGPRS standards, the block before the SSN is implicitly NACK'ed). The uplink PAN field 185 further includes a beginning of window (BOW) field to indicate whether the SSN field indicates (at least indirectly) the identity of the data block corresponding to the beginning of the receive window maintained by the receiver providing the acknowledgment information.

As specified by the EGPRS standards, the downlink PAN field 190 can employ SSN-based encoding or time-based coding. In the case of SSN-based encoding, the downlink PAN field 190 includes an RB field, an SSN field and a BOW field as described above for the uplink PAN field 185. In the case of time-based encoding, the downlink PAN field 190 includes the RB field, with the particular blocks being acknowledged determined based on the time the downlink PAN field 190 is sent. SSN-based encoding of the downlink PAN field 190 is assumed herein.

In general, it is expected that acknowledgment information provided by a PAN field is less reliable than the acknowledgment information provided by a packet ACK/NACK control message. The reduced reliability of the PAN field generally results from less error detection and correction, less robust encoding, or both, being employed for the PAN field than for a control message. Because of a resulting higher probability of false positive detections, PAN fields are generally treated with caution to avoid the possibility of any serious failure arising in case of such a false positive detection. For example, as a result of false positive decoding of a PAN, an RLC/MAC transmitter may incorrectly believe that an RLC/MAC data block has been received successfully by its peer, thereby causing the transmitter to remove the block from its transmit buffer. To avoid such serious failures, a tentative acknowledgment state (referred to herein as a "TENTATIVE_ACK" state) is used to indicate that an ACK indication has been received via a PAN field, and not via a packet ACK/NACK control message, for a previously transmitted data block. Therefore, a transmitted RLC/MAC data block can be associated with at least the following acknowledgment states: ACKED (positively acknowledged or positive acknowledgment), TENTATIVE_ACK (tentatively acknowledged or tentative acknowledgment), NACKED (negatively acknowledged or negative acknowledgment), PENDING_ACK (pending acknowledgment, that is, no acknowledgment information has as yet been received for this data block since its most recent transmission), INVALID (indicating that the data block is not within the transmit window), etc.

As mentioned above, an RLC/MAC transmitter generally cannot move its associated transmit window until the oldest block in the window is associated with an ACKED state (i.e., until there is confirmation that the oldest block has been received). Thus, in at least some configurations, the mobile station's RLC/MAC transmitter 115 will retransmit uplink RLC/MAC data blocks 155 having a TENTATIVE_ACK state when a corresponding uplink physical data channel 160 has been allocated to the mobile station 105, but the mobile station has no other data blocks to send (e.g., such as no new data blocks or previously transmitted data blocks associated with the NACKED or PENDING_ACK states). Even though these TENTATIVE_ACK blocks have likely been received by the network element's RLC/MAC receiver 135, the mobile station's RLC/MAC transmitter 115 will continue transmitting such TENTATIVE_ACK blocks until the positive acknowledgment status of these blocks is confirmed. Conventional mobile stations require that such confirmation be provided by way of a packet uplink ACK/NACK control message 165 confirming acknowledgment of the TENTATIVE_ACK blocks.

However, as described in greater detail below, the mobile station 105 is also able to use information obtained from a previously decoded downlink PAN field 190 to determine a relative alignment (e.g., possibly including an offset) of the transmit window maintained by the mobile station's RLC/MAC transmitter 115 and a receive window maintained by the network element's RLC/MAC receiver 135. Using this determined window alignment information, the mobile station 105 can confirm acknowledgment of the TENTATIVE_ACK blocks (thereby allowing these blocks to be associated with an ACKED state and allowing the transmit window maintained by the mobile station's RLC/MAC transmitter 115 to be incremented).

Additionally or alternatively, the mobile station 105 can use the window alignment information to determine when the retransmission of TENTATIVE_ACK blocks can be skipped (thereby potentially reducing the processing loads of the mobile station 105 or the network element 110, or both). Also, in at least some example implementations, even if the skipping of sending TENTATIVE_ACK blocks means that some other block (e.g., such as a packet uplink dummy control block) will be sent instead, a benefit can still exist. For example, transmitting such other block instead of the TENTATIVE_ACK block may still induce less processing load for the mobile station 105 or the network element 110, or both. Additionally or alternatively, transmitting such other block instead of the TENTATIVE_ACK block may provide more useful information to the network element 110, at least in some operating scenarios.

Furthermore, during typical FANR operation in the EGPRS system 100, the network element 110 will poll the mobile system 105 to provide downlink acknowledgment information in the PAN field 185 accompanying a subsequent uplink RLC/MAC data block 155 until the network element 110 needs to move its transmit window (e.g., to allow transmitted downlink blocks NACK'ed by the mobile station to be quickly retransmitted). Then, to allow its transmit window to move, the network element 110 will poll the mobile system 105 to provide downlink acknowledgment information in a separate EGPRS packet downlink ACK/NACK control message 145 (e.g. to allow confirmation of previously transmitted blocks associated with a TENTATIVE_ACK state). Also, when the mobile system 105 is polled to provide downlink acknowledgment information in the PAN field 185, but the mobile station 105 has no uplink RLC/MAC data blocks 155 to send, the mobile station 105 can respond to the poll with a packet downlink ACK/NACK control message 145, thereby providing early confirmation of the downlink data blocks and allowing the network element 110 to advance its transmit window.

However, even if the only remaining uplink data block to transmit is a block having a TENTATIVE_ACK state, a conventional EGPRS mobile station is required to resend this TENTATIVE_ACK block with an accompanying PAN field in response to the poll for a PAN, even though the TENTATIVE_ACK block has likely been already received by the network. Such a retransmission of the TENTATIVE_ACK block has little benefit, especially since the TENTATIVE_ACK block has likely been already received by the network and the network cannot advance its transmit window based on acknowledgment information received only via a PAN.

In contrast, the mobile station 105 of the illustrated example is able to use information obtained from a previously decoded downlink PAN field 190 to determine a relative alignment of the transmit window maintained by the mobile station's RLC/MAC transmitter 115 and a receive window maintained by the network element's RLC/MAC receiver 135. Such window alignment information can be used by the mobile station's RLC/MAC transmitter 115 to determine when it can skip resending a TENTATIVE_ACK block 155 (along with the requested PAN field 185) and, instead, send the packet downlink ACK/NACK control message 145 to the network element 110 in response to a poll for a PAN. By not retransmitting TENTATIVE_ACK blocks in this case, the mobile station 105 can send the packet downlink ACK/NACK control message 145 to the network element 110 earlier than in a conventional implementation. Sending the packet downlink ACK/NACK control message 145 instead of the PAN 185 yields substantial benefits, such as providing more acknowledgment information than can be provided in a PAN and confirming acknowledgment of any previous downlink RLC/MAC blocks 175 sent to the mobile station, thereby allowing the network element 110 to advance its transmit window earlier than in a conventional implementation.

Figure 4:
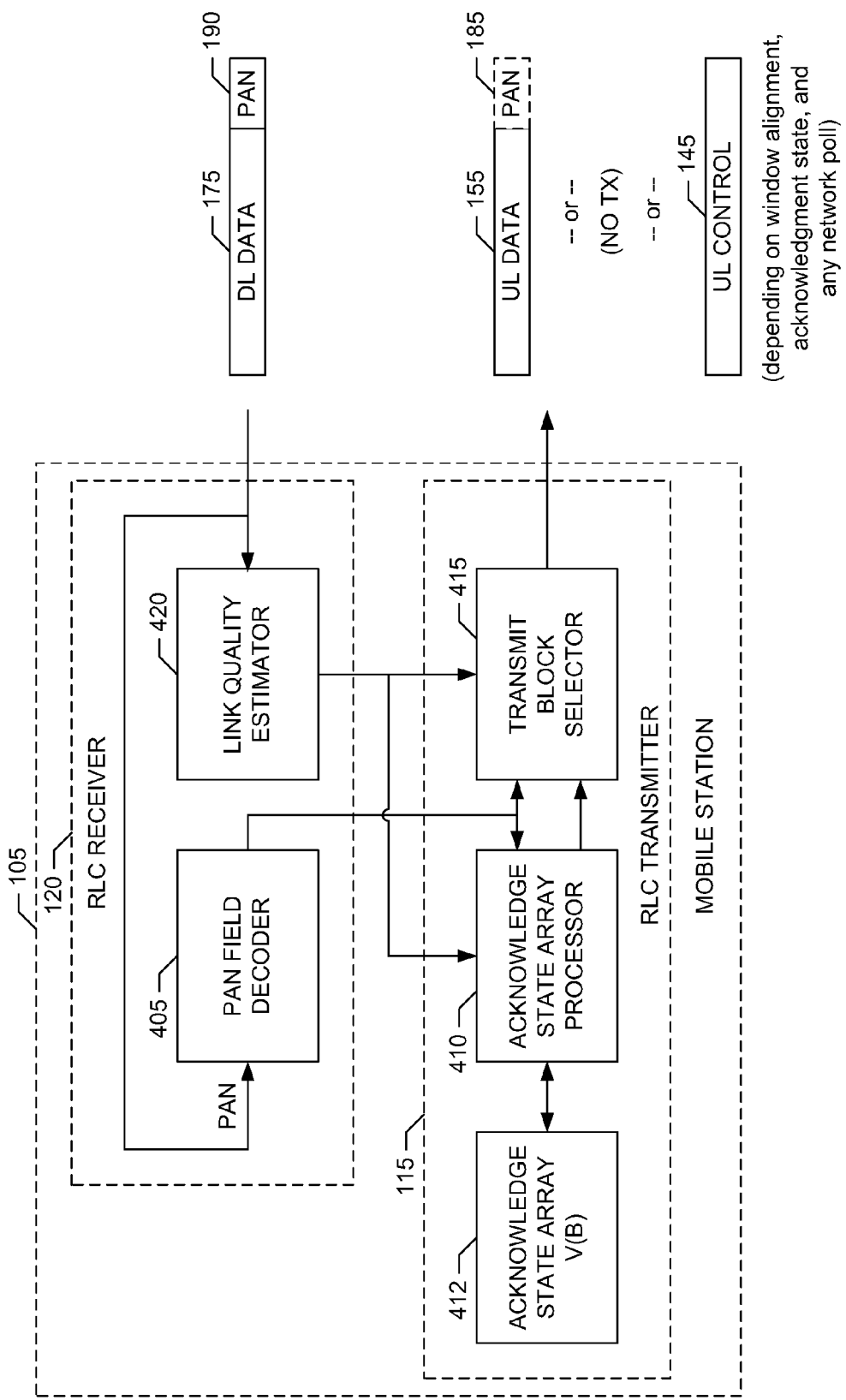

An example implementation of the mobile station 105 depicting use of relative window alignment information to process acknowledgment information associated with uplink data blocks is illustrated in FIG. 4 and described in greater detail below. Also, although the example methods and apparatus disclosed herein are described in the context of the EGPRS system 100 of FIG. 1, these example methods and apparatus can be readily adapted for use in any communication system in which acknowledgment information can be provided via a control message and, alternatively, via transmission in a field accompanying a data block. Furthermore, due the symmetry of the RLC/MAC transmitters and receivers included in the mobile station 105 and the network element 110, although the example methods and apparatus disclosed herein are described from the perspective of implementation by the mobile station 105, the disclosed example methods and apparatus could also be implemented by the network element 110.

Figure 2:
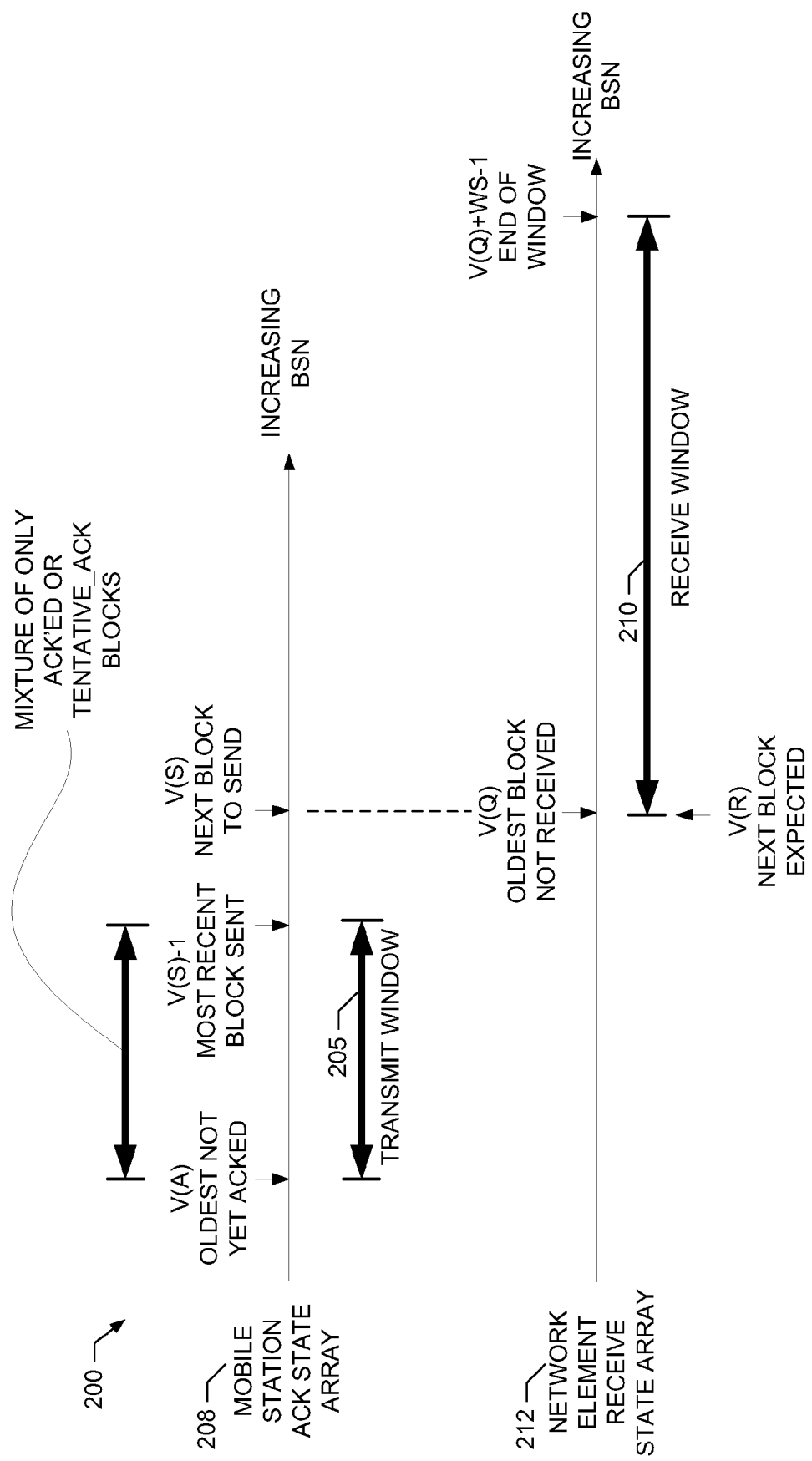

A first example window alignment scenario 200 that can be used by the mobile station 105 to process acknowledgement information associated with uplink data blocks to, for example, confirm acknowledgment of TENTATIVE_ACK blocks or determine when to skip transmission of TENTATIVE_ACK blocks is illustrated in FIG. 2. The first example window alignment scenario 200 depicts a transmit window 205 maintained by the mobile station 105 using at least a portion of an acknowledge state array 208. The mobile station 105 represents the start of the example transmit window 205 with an acknowledge state variable, V(A), corresponding to the block sequence number (BSN) of the oldest uplink data block (e.g., such as an uplink RLC/MAC data block 155) that is not associated with an ACKED state (e.g., that has not been positively acknowledged by its peer). The mobile station 105 uses a send state variable, V(S), to indicate the BSN of the next new uplink data block to be transmitted. Thus, the send state variable, V(S), is in lock step with the end of the transmit window, V(S)-1, where V(S)-1 indicates the BSN of the newest uplink data block that has been transmitted by the mobile station 105.

Additionally, the first example window alignment scenario 200 also depicts a receive window 210 maintained by the network element 110 using at least a portion of a receive state array 212, with the example receive window 210 being aligned with the transmit window 205 maintained by the mobile station 105 (e.g., with such alignment possibly including a relative offset, as shown). The network element 110 represents the start of the receive window 210 with a receive state variable, V(Q), corresponding to the BSN for the oldest uplink data block not yet received (e.g., such as an uplink RLC/MAC data block 155). Additionally, the network element 110 uses the state variable V(R) to indicate the BSN of the next data block expected to be received. As described in greater detail below, the mobile station 105 is able to ascertain the receive window 210 maintained by the network element 110 and, in particular, the start of the receive window, V(Q), using uplink acknowledgment information provided by the network element 110 via a PAN field (e.g., such as an example PAN field 190).

In the first example window alignment scenario 200, all of the previously transmitted uplink data blocks included in the transmit window 205 are associated with either an ACKED state or a TENTATIVE_ACK state. As such, all of these uplink blocks have been positively acknowledged via a packet uplink ACK/NACK control message (e.g., such as a packet uplink ACK/NACK control message 165, which yields an ACKED state) or a PAN field (e.g., such as a PAN field 190, which yields a TENTATIVE_ACK state). Additionally, the receive window 210 as ascertained by the mobile station 105 further indicates that all previously transmitted uplink data blocks have been received by the network element 110. This is because the start of the receive window, V(Q), indicates that the network element 110 has received all previous uplink data blocks and is waiting for the next new uplink data block to be sent by the mobile station 105 and corresponding to the send state variable, V(S). In other words, the receive state variable, V(Q), of the receive window is aligned with the send state variable, V(S), of the transmit window. Such a scenario can be used to provide confirmation of the positive acknowledgment status of all previously transmitted data blocks in the transmit window 205, especially if the uplink acknowledgment information provided by the network element 110 via the PAN field further indicates that there have been no subsequent data blocks received by the network element 110 (otherwise, the PAN field would be exhibiting decoding errors because no new uplink data blocks have has yet been transmitted by the mobile station 105) or, more generally, is at least consistent with the previous transmissions by the mobile station 105. As described in detail below, when the mobile station 105 detects the first example window alignment scenario 200, the mobile station 105 can confirm acknowledgment of TENTATIVE_ACK blocks or skip retransmission of TENTATIVE_ACK blocks.

Figure 3:
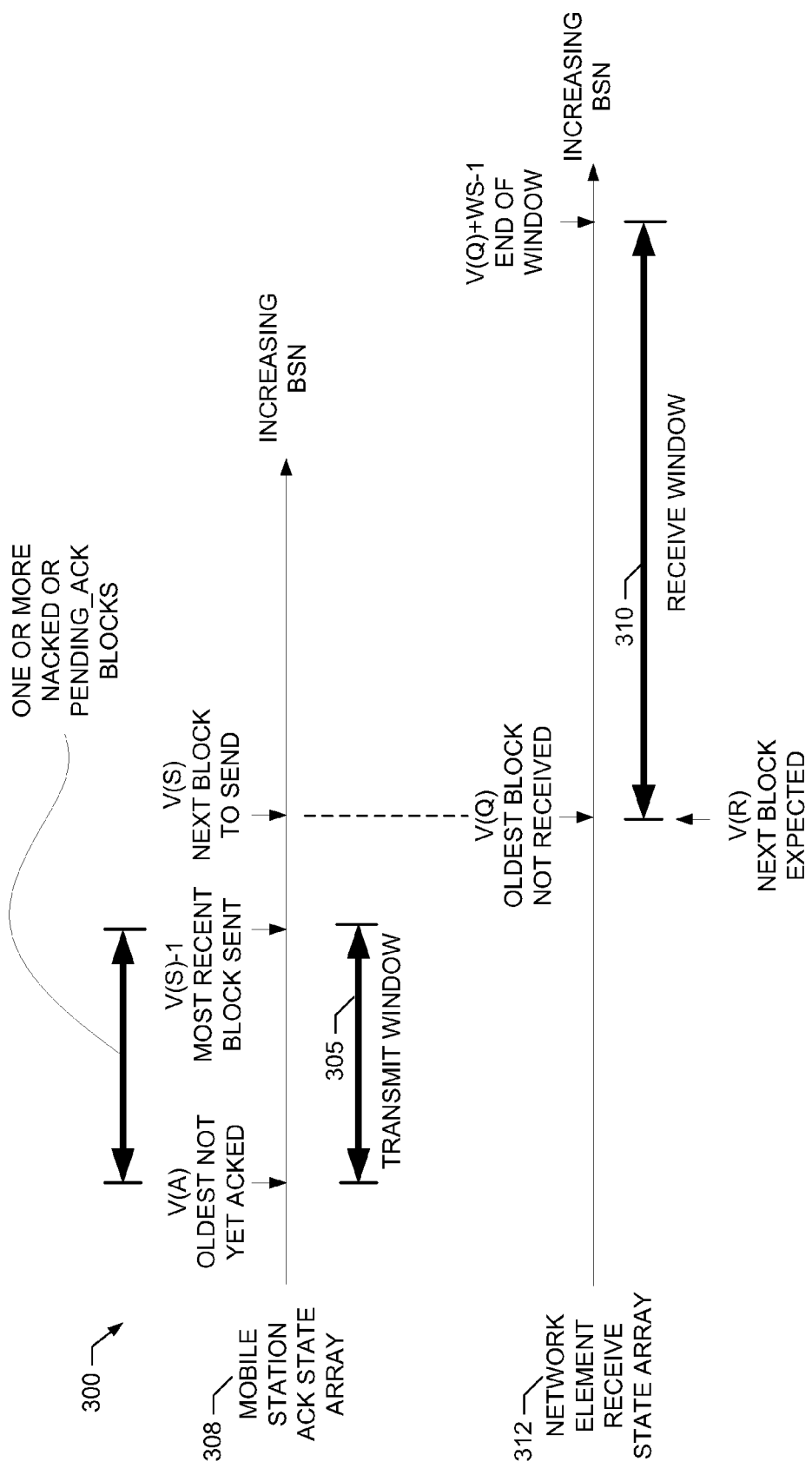

A second example window alignment scenario 300 that can be used by the mobile station 105 to process acknowledgment information associated with uplink data blocks to, for example, confirm acknowledgment of TENTATIVE_ACK blocks or skip transmission of TENTATIVE_ACK blocks is illustrated in FIG. 3. The second example window alignment scenario 300 depicts a transmit window 305 maintained by the mobile station 105 using at least a portion of an acknowledge state array 308. The second example window alignment scenario 300 also depicts a receive window 310 maintained by the network element 110 using at least a portion of a receive state array 312, and which can be ascertained by the mobile station 105 from uplink acknowledgment data provided by was of a PAN field as mentioned above. In the illustrated example, the receive window 310 is aligned with the transmit window 305 in that the start of the receive window, V(Q), is aligned with the send state variable, V(S), of the transmit window 305, with the start of the transmit window 305 being designated as V(A).

The example transmit and receive windows 305 and 310 are similar to the example transmit and receive windows 205 and 210 of the first example window alignment scenario 200. However, unlike the first example window alignment scenario 200, the transmit window 305 depicted in the second window alignment scenario 300 has one or more uplink data blocks associated with a NACKED or PENDING_ACK state, indicating that such blocks have not been positively acknowledged by the network element 110. However, the receive window 310 as ascertained by the mobile station 105 indicates that all previously transmitted uplink data blocks have been received by the network element 110. Because the receive window 310 is determined to be so aligned with the transmit window 305 (e.g., the receive state variable, V(Q), of the receive window is determined to be aligned with the send state variable, V(S), of the transmit window, thereby indicating that all previously transmitted uplink blocks have been received), the mobile station 105 could confirm the positive acknowledgment status or skip retransmission of all previously transmitted data blocks in the transmit window 305, or at least those data blocks, if any, already associated with an ACKED or TENTATIVE_ACK state, especially if the uplink acknowledgment information provided by the network element 110 via the PAN field further indicates that there have been no subsequent data blocks. However, such confirmation would be potentially less reliable than the confirmation provided by the first example window alignment scenario 200 because all of the uplink data blocks included in the transmit window 305 have not already been associated with and ACKED or TENTATIVE_ACK state.

A block diagram of an example implementation of the mobile station 105 included in the EGPRS system 100 of FIG. 1 is illustrated in FIG. 4. In particular, FIG. 4 illustrates example implementations of the mobile station's RLC/MAC transmitter 115 and the mobile station's RLC/MAC receiver 120. In the illustrated example of FIG. 4, the mobile station's RLC/MAC receiver 120 includes a PAN field decoder 405 to decode PAN fields 190 received from a network element (e.g., such as the network element 110) and providing uplink acknowledgment data for received uplink data blocks (e.g., such as the uplink RLC/MAC data blocks 155). For example, the PAN field decoder 405 decodes an RB field included in a received PAN 190, where the RB field provides a set of acknowledgment bits, with each bit providing an ACK or NACK indication for a respective received data block being acknowledged by the RB. Additionally, the example PAN field decoder 405 decodes an SSN field included in a received PAN, where the SSN corresponds to the BSN of the first data block covered by the RB field. Furthermore, the PAN field decoder 405 decodes a BOW field included in a received PAN indicating whether the SSN field indicates the identity of the data block representing the start of the network element's receive window, V(Q). Thus, if the BOW field indicates that the SSN field identifies the start of the network element's receive window, V(Q), then the decoded SSN indicates (at least indirectly) the BSN of the starting data block in the network element's receive window (e.g., because SSN=V(Q)+1 in this case), which can be compared with send state variable, V(S), of the mobile station's transmit window.

In the illustrated example of FIG. 4, the mobile station's RLC/MAC transmitter 115 includes an acknowledge state array processor 410 to update an acknowledge state array 412 (designated also as "V(B)" herein and in the figures) storing acknowledgment states for a set of previously transmitted uplink data blocks (e.g., such as the uplink RLC/MAC data blocks 155). During a current processing interval, the example acknowledge state array processor 410 updates a set of acknowledge state array elements in V(B) corresponding to those uplink data blocks in the current transmit window maintained by the mobile station's RLC/MAC transmitter 115. For example, the set of acknowledge state array elements in V(B) to be updated starts at the transmit window's starting BSN, V(A), corresponding to the block sequence number of the oldest uplink data block not associated with an ACKED state, and extends to the BSN, V(S), of the next uplink data block to be transmitted, without extending past a specified window size, WS.

During a particular processing iteration, the acknowledge state array processor 410 updates the acknowledgment state for any uplink data blocks for which acknowledgment information has been received. Additionally, the acknowledge state array processor 410 processes decoded PAN field data provided by the PAN field decoder 405 for a previously decoded PAN field 190. For example, the acknowledge state array processor 410 determines whether the decoded BOW field identifies the start of the network element's receive window, V(Q). If so, the acknowledge state array processor 410 determines whether the decoded SSN field indicates that the start of the network element's receive window, V(Q), corresponds to the send state variable, V(S), of the next new uplink data block to be transmitted in the mobile station's transmit window, which would indicate that the network element's receive window is so aligned with the mobile station's transmit window. If such an alignment scenario is ascertained, the acknowledge state array processor 410 determines whether the alignment scenario corresponds to the first example window alignment scenario 200 described above in connection with FIG. 2 (e.g., the scenario in which the acknowledgment state for each uplink data blocks in the mobile station's transmit window is either the ACKED state or the TENTATIVE_ACK state). If so, the acknowledge state array processor 410 confirms the positive acknowledgment state for all uplink data blocks included in the mobile station's transmission window by updating the respective elements in the acknowledge state array 412 to the ACKED state. Such operation allows blocks associated with a TENTATIVE_ACK state to be confirmed as being positively acknowledged without requiring use of a separate ACK/NACK control message or possibly any retransmission of such TENTATIVE_ACK blocks, as described below.

In some example implementations, if the alignment scenario ascertained by the acknowledge state array processor 410 does not correspond to the first example window alignment scenario 200, the acknowledge state array processor 410 further determines whether the alignment scenario corresponds to the second example window alignment scenario 300 described above in connection with FIG. 3 (e.g., the scenario in which the acknowledgment state for at least one of the uplink data blocks in the mobile station's transmit window is either the NACKED state or the PENDING_ACK state). If so, the acknowledge state array processor 410 confirms the positive acknowledgment state for only those uplink data blocks associated with a TENTATIVE_ACK state by updating the respective elements in the acknowledge state array 412 to the ACKED state. Such operation also allows blocks associated with a TENTATIVE_ACK state to be confirmed as being positively acknowledged without requiring use of a separate ACK/NACK control message or possibly any retransmission of such TENTATIVE_ACK blocks, as follows. (In some further example implementations, the acknowledge state array processor 410 confirms the positive acknowledgment state all previously transmitted uplink blocks regardless of their respective acknowledgment states when the second example window alignment scenario 300 is detected.)

In the illustrated example of FIG. 4, the mobile station's RLC/MAC transmitter 115 also includes a transmit block selector 415 to select a next uplink data block for transmission by the mobile station's RLC/MAC transmitter 115 as the uplink RLC/MAC data block 155 illustrated in FIG. 4. For example, after the acknowledge state array processor 410 updates the acknowledgment states stored in the acknowledge state array V(B) as described above, the example transmit block selector 415 processes the array V(B) and selects uplink data blocks associated with a NACKED state for retransmission. If no uplink data blocks are associated with a NACKED state, the transmit block selector 415 selects the next available new (e.g., non-transmitted) uplink data block for transmission (assuming that the transmit window has not stalled because a maximum number of uplink data blocks have been transmitted since an oldest uplink data block still not associated with an ACKED state). However, if there are also no new uplink data blocks (or the transmit window has stalled), the transmit block selector 415 processes the array V(B) and selects previously transmitted uplink data blocks associated with a PENDING_ACK state for retransmission (because acknowledgment information has not yet been received for such previously transmitted uplink blocks). If, however, there are also no uplink data blocks associated with a PENDING_ACK state, the transmit block selector 415 processes the array V(B) and selects previously transmitted uplink data blocks associated with a TENTATIVE_ACK state for retransmission (because acknowledgment of such previously transmitted blocks will need to be confirmed before the transmit window maintained by the mobile station's RLC/MAC transmitter 115 can be incremented). However, if there are also no previously transmitted uplink data blocks associated with a TENTATIVE_ACK state, the transmit block selector 415 indicates that there are no uplink data blocks to be transmitted.

In the illustrated example, the transmit block selector 415 also processes the decoded PAN field data provided by the PAN field decoder 405 for a previously decoded PAN field 190 to determine whether to modify its uplink block selection. For example, the transmit block selector 415 processes the decoded PAN field data in a manner similar to the acknowledge state array processor 410 to determine if the network element's receive window and the mobile station's transmit window are aligned (e.g., possibly with a relative offset) as in the first example window alignment scenario 200 described above in connection with FIG. 2 (e.g., the scenario in which the acknowledgment state for each uplink data blocks in the mobile station's transmit window is either the ACKED state or the TENTATIVE_ACK state). Then, if the transmit block selector 415 has selected an uplink data block associated with a TENTATIVE_ACK state for transmission and the first example window alignment scenario 200 has been detected, the transmit block selector 415 revises its selection to indicate that there are no uplink data blocks to be transmitted. By indicating that there are no uplink data blocks to be transmitted, the transmit block selector 415 causes the mobile station's RLC/MAC transmitter 115 to skip retransmitting the uplink data block associated with a TENTATIVE_ACK state (designated as "(NO TX)" in FIG. 4). Such operation can be used to achieve the processing load reduction benefits described above. Additionally, by revising the selection of a TENTATIVE_ACK blocks to indicate there are no uplink blocks to send, the transmit block selector 415 can cause the mobile station's RLC/MAC transmitter 115 to send an EGPRS downlink packet ACK/NACK control message 145 as illustrated in FIG. 4 instead of sending the requested PAN 185 along with resending the TENTATIVE_ACK block as the uplink RLC/MAC data block 155, thereby providing further benefits as described above.

In some example implementations, the transmit block selector 415 also performs the preceding selection modification to indicate that there are no uplink blocks to be transmitted when the second example window alignment scenario 300 described above in connection with FIG. 3 has been detected (e.g., the scenario in which the acknowledgment state for at least one of the uplink data blocks in the mobile station's transmit window is either the NACKED state or the PENDING_ACK state).

In the illustrated example of FIG. 4, both the acknowledge state array processor 410 determines whether to confirm acknowledgment of TENTATIVE_ACK blocks based on determining whether the network element's receive window is aligned with the mobile station's transmit window, and the transmit block selector 415 determines whether to forego sending a TENTATIVE_ACK block based on determining whether the network element's receive window is aligned with the mobile station's transmit window. However, in other example implementations, only one of the acknowledge state array processor 410 or the transmit block selector 415 may be configured to perform such processing.

In the illustrated example of FIG. 4, the mobile station's RLC/MAC receiver 120 also includes a link quality estimator 420 to measure or estimate the link quality or probability of error, or both, for the PAN field(s) received and decoded by the PAN field decoder 405. The example link quality estimator 420 determines such information using any appropriate measurement or estimation technique. In the illustrated example, the link quality estimator 420 provides the link quality information or the probability of error information, or both, for decoded PAN field(s) to the acknowledge state array processor 410 and the transmit block selector 415. In an example implementation, the transmit block selector 415 processes the provided link quality information or probability of error information, or both, to determine whether retransmission of uplink data blocks having a TENTATIVE_ACK state is unnecessary (e.g., because there is a high likelihood that the acknowledgment data received via a PAN field for such blocks was correct). For example, if the link quality is poor or the probability of error is high, or both, the transmit block selector 415 causes a selected TENTATIVE_ACK block to be retransmitted. However, if the link quality is good or the probability of error is low, or both, the transmit block selector 415 can forego transmission of any selected TENTATIVE_ACK blocks.

Similarly, in an example implementation, the acknowledge state array processor 410 processes the provided link quality information or probability of error information, or both, to determine whether to confirm acknowledgment of uplink data blocks having a TENTATIVE_ACK state (e.g., because there is a high likelihood that the acknowledgment data received via a PAN field for such blocks was correct). For example, if the link quality is poor or the probability of error is high, or both, the acknowledge state array processor 410 can leave the acknowledgment state of a TENTATIVE_ACK block unchanged. However, if the link quality is good or the probability of error is low, or both, the acknowledge state array processor 410 can update the acknowledgment state of the TENTATIVE_ACK block to the ACKED state.

While an example manner of implementing the example mobile station 105 of FIG. 1 has been illustrated in FIG. 4, one or more of the elements, processes and/or devices illustrated in FIG. 4 may be combined, divided, re-arranged, omitted, eliminated and/or implemented in any other way. Further, the example RLC/MAC transmitter 115, the example RLC/MAC receiver 120, the example PAN field decoder 405, the example acknowledge state array processor 410, the example transmit block selector 415, the example link quality estimator 420 and/or, more generally, the example mobile station 105 of FIG. 4 may be implemented by hardware, software, firmware and/or any combination of hardware, software and/ or firmware. Thus, for example, any of the example RLC/MAC transmitter 115, the example RLC/MAC receiver 120, the example PAN field decoder 405, the example acknowledge state array processor 410, the example transmit block selector 415, the example link quality estimator 420 and/or, more generally, the example mobile station 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example mobile station 105, the example RLC/MAC transmitter 115, the example RLC/MAC receiver 120, the example PAN field decoder 405, the example acknowledge state array processor 410, the example transmit block selector 415 and/or the example link quality estimator 420 are hereby expressly defined to include a tangible medium such as a memory, digital versatile disk (DVD), compact disk (CD), etc., storing such software and/or firmware. Further still, the example mobile station 105 of FIG. 4 may include one or more elements, processes and/or devices in addition to, or instead of, those illustrated in FIG. 4, and/or may include more than one of any or all of the illustrated elements, processes and devices.

Figure 5:
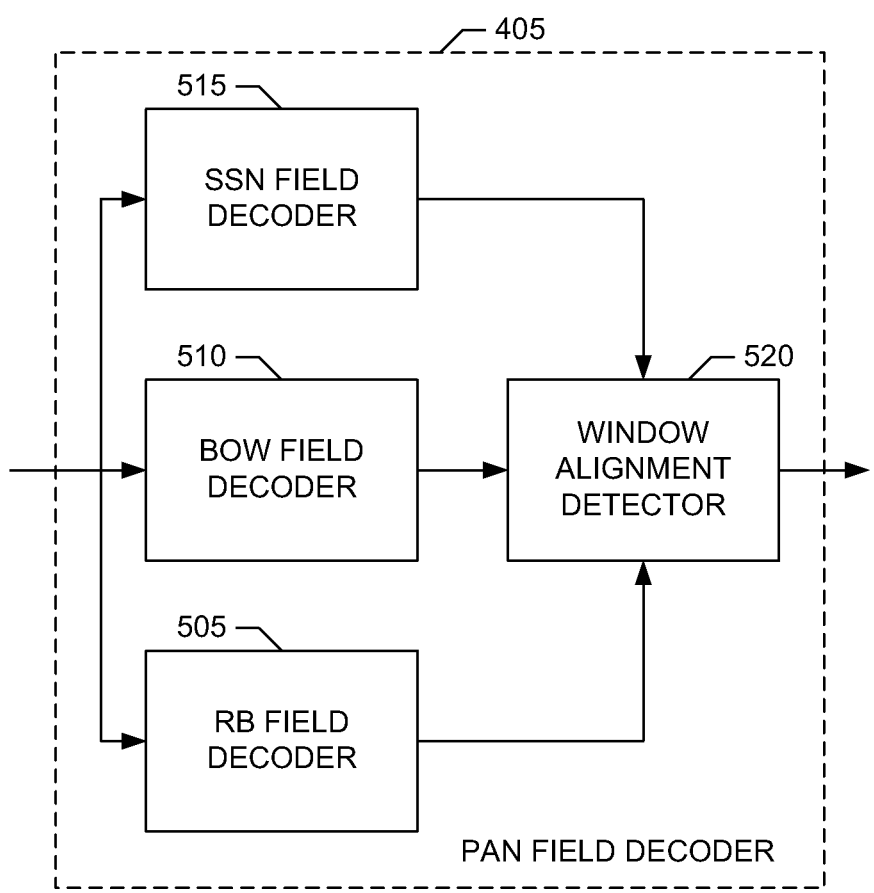

A block diagram of an example implementation of the PAN field decoder 405 of FIG. 4 is illustrated in FIG. 5. In the illustrated example of FIG. 5, the PAN field decoder 405 is intended for implementation in a mobile station (e.g., such as the mobile station 105) and includes an RB field decoder 505 to decode an RB field included in a received PAN field. As mentioned above, each bit of the RB field represents an ACK or NACK indication for a respective uplink data block being acknowledged by the RB. In a first example implementation, the RB field is encoded using a logic-0 to represent a NACK indication and a logic-1 to represent an ACK indication. Additionally, if the length of the RB field exceeds the number of uplink data blocks being acknowledged, the remaining bits in the RB field default to a value of logic-0. In a second example implementation, the RB field is encoded using a logic-0 to represent a NACK indication and a logic-1 to represent either an ACK indication or that no acknowledgment indication is being provided (e.g., supporting an implementation in which only NACK indications in a PAN field are to be processed). Additionally, if the length of the RB field exceeds the number of uplink data blocks being acknowledged, the remaining bits in the RB field default to a value of logic-1 (e.g., defaulting to indicate that there is no acknowledgment information being provided via these bits). In the illustrated example, the RB field decoder 505 decodes the logic values for each bit in the RB field of the received PAN.

The example PAN field decoder 405 of FIG. 5 also includes an BOW field decoder 510 to decode a BOW field included in a PAN field received from a network element (e.g., such as the network element 110). As mentioned above, the BOW field indicates whether the SSN field identifies (at least indirectly) the start of the network element's receive window, V(Q) (e.g., because SSN=V(Q)+1 in this case). In an example implementation, the BOW field includes a bit that is set to a logic-1 to indicate that the SSN field identifies the start of the network element's receive window, V(Q), and that is set to logic-0 otherwise. In the illustrated example, the BOW field decoder 510 decodes the logic value of this bit in the BOW field and outputs an indication of whether the SSN field identifies the start of the network element's receive window, V(Q).

Additionally, the example PAN field decoder 405 of FIG. 5 includes an SSN field decoder 515 to decode an SSN field included in a received PAN field. As mentioned above, the SSN corresponds to the BSN of the first data block covered by the RB field included in the received PAN. In an example implementation, the SSN field includes a binary representation of the BSN of the first data block covered by the RB field. In the illustrated example, the SSN field decoder 515 decodes the binary data in the SSN field and converts the binary data to a numerical value representative of the BSN of the first data block covered by the RB field.

In the illustrated example of FIG. 5, the PAN field decoder 405 further includes a window alignment detector 520 to process the decoded information provided by the RB field decoder 505, the BOW field decoder 510 and the SSN field decoder 515 to determine whether the network element's receive window is aligned with the mobile station's transmit window. Additionally or alternatively, the example window alignment detector 520 could be included in the acknowledge state array processor 410 or the transmit block selector 415, or both, of FIG. 4. To determine whether the network element's receive window is aligned with the mobile station's transmit window, the window alignment detector 520 determines whether the decoded BOW field indicates that the SSN field in the received PAN identifies the start of the network element's receive window, V(Q). If so, the window alignment detector 520 determines whether the decoded SSN field indicates that the start of the network element's receive window, V(Q), corresponds to the send state variable, V(S), of the mobile station's transmit window, which would indicate that the network element's receive window is aligned with the mobile station's transmit window.

If the decoded BOW and SSN fields indicate that the network element's receive window is so aligned with the mobile station's transmit window, then the network element's receive window corresponds to the scenario in which all previously transmitted uplink data blocks have been received by the network element and the network element is awaiting the next new uplink data block to be transmitted by the network. Because the BOW and SSN fields indicate that the start of the RB field points to the start of the network element's receive window, and mobile station has not yet transmitted a new uplink data block, the decoded RB field should correspond to the scenario in which no acknowledgment information is being provided for uplink data blocks beyond the start of the network element's receive window. Thus, in the first RB encoding example described above, the bits in the RB field corresponding to uplink data blocks beyond the start of the network element's receive window should be defaulted to a value of logic-0 and, in the second RB encoding example described above, these bits in the RB field should be defaulted to a value of logic-1. Accordingly, the window alignment detector 520 determines whether the decoded bits in the RB field have the appropriate default values for any bits corresponding to uplink data blocks beyond the start of the network element's receive window. If so, the window alignment detector 520 outputs an indication that the network element's receive window is aligned with the mobile station's transmit window.

While an example manner of implementing the PAN field decoder 405 of FIG. 4 has been illustrated in FIG. 5, one or more of the elements, processes and/or devices illustrated in FIG. 5 may be combined, divided, re-arranged, omitted, eliminated and/or implemented in any other way. Further, the example RB field decoder 505, the example BOW field decoder 510, the example SSN field decoder 515, the example window alignment detector 520 and/or, more generally, the example PAN field decoder 405 of FIG. 5 may be implemented by hardware, software, firmware and/or any combination of hardware, software and/or firmware. Thus, for example, any of the example RB field decoder 505, the example BOW field decoder 510, the example SSN field decoder 515, the example window alignment detector 520 and/or, more generally, the example PAN field decoder 405 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example PAN field decoder 405, the example RB field decoder 505, the example BOW field decoder 510, the example SSN field decoder 515 and/or the example window alignment detector 520 are hereby expressly defined to include a tangible medium such as a memory, digital versatile disk (DVD), compact disk (CD), etc., storing such software and/or firmware. Further still, the example PAN field decoder 405 of FIG. 5 may include one or more elements, processes and/or devices in addition to, or instead of, those illustrated in FIG. 5, and/or may include more than one of any or all of the illustrated elements, processes and devices.

Figure 6:
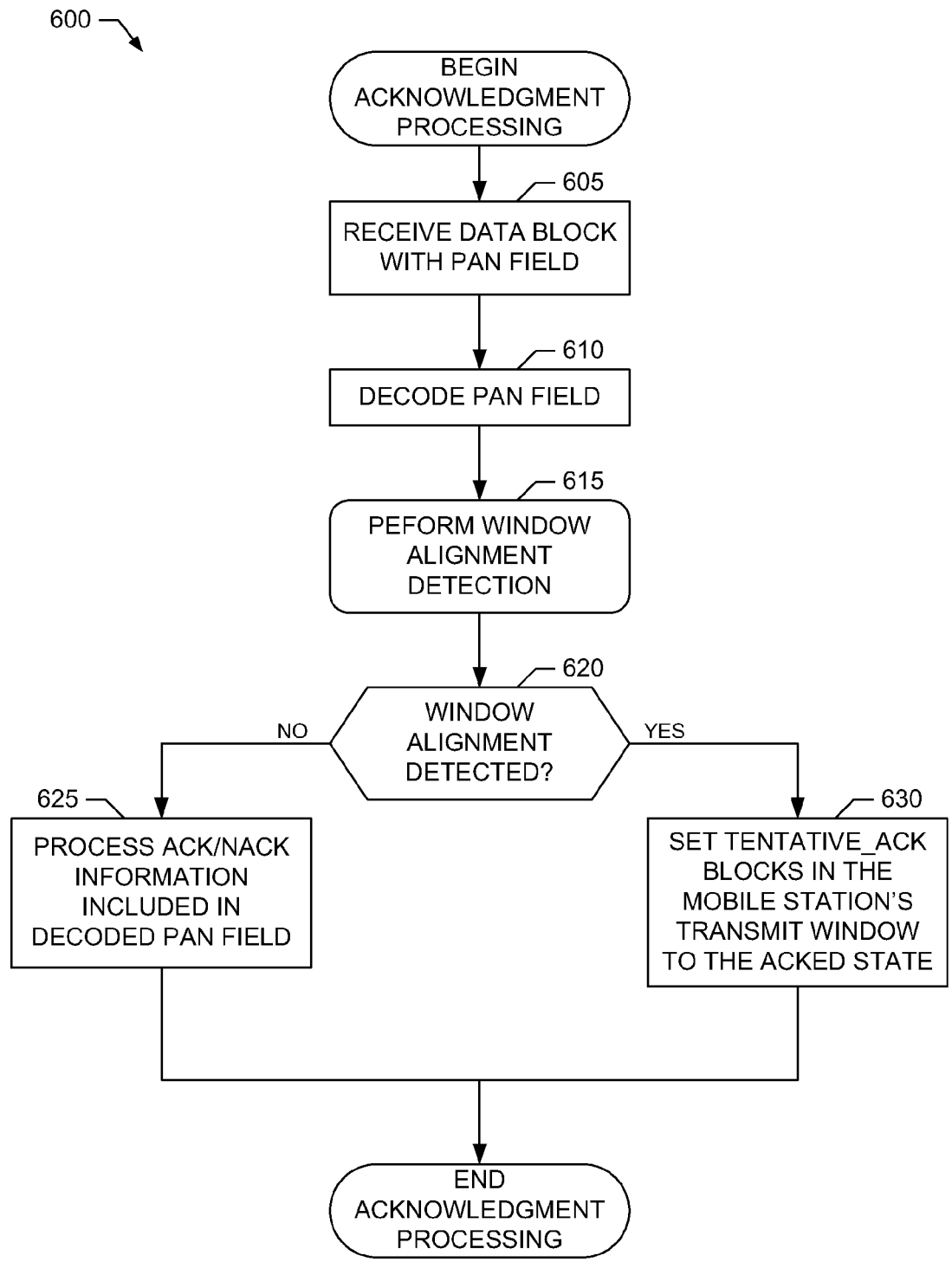
Figure 7:
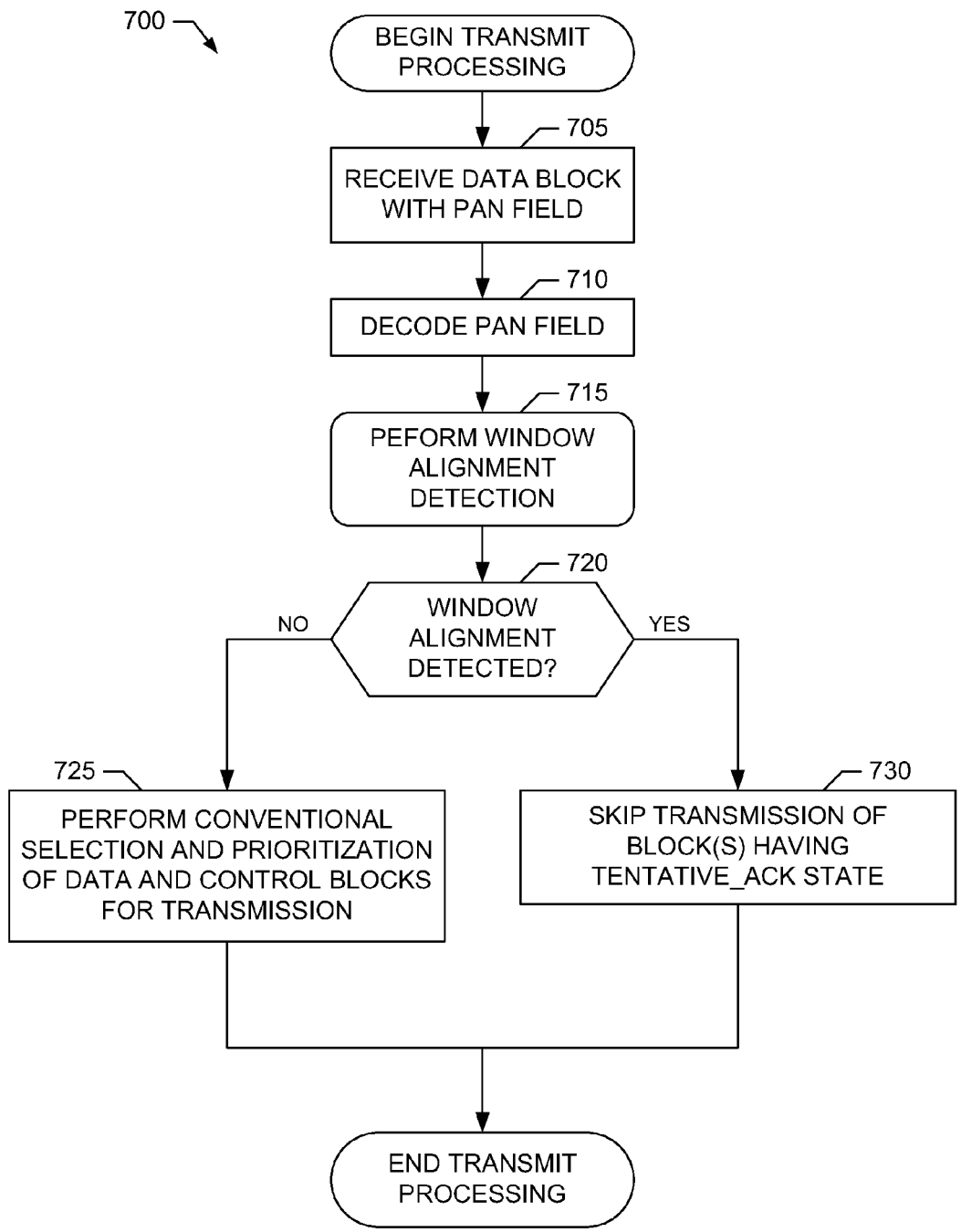
Figure 8:
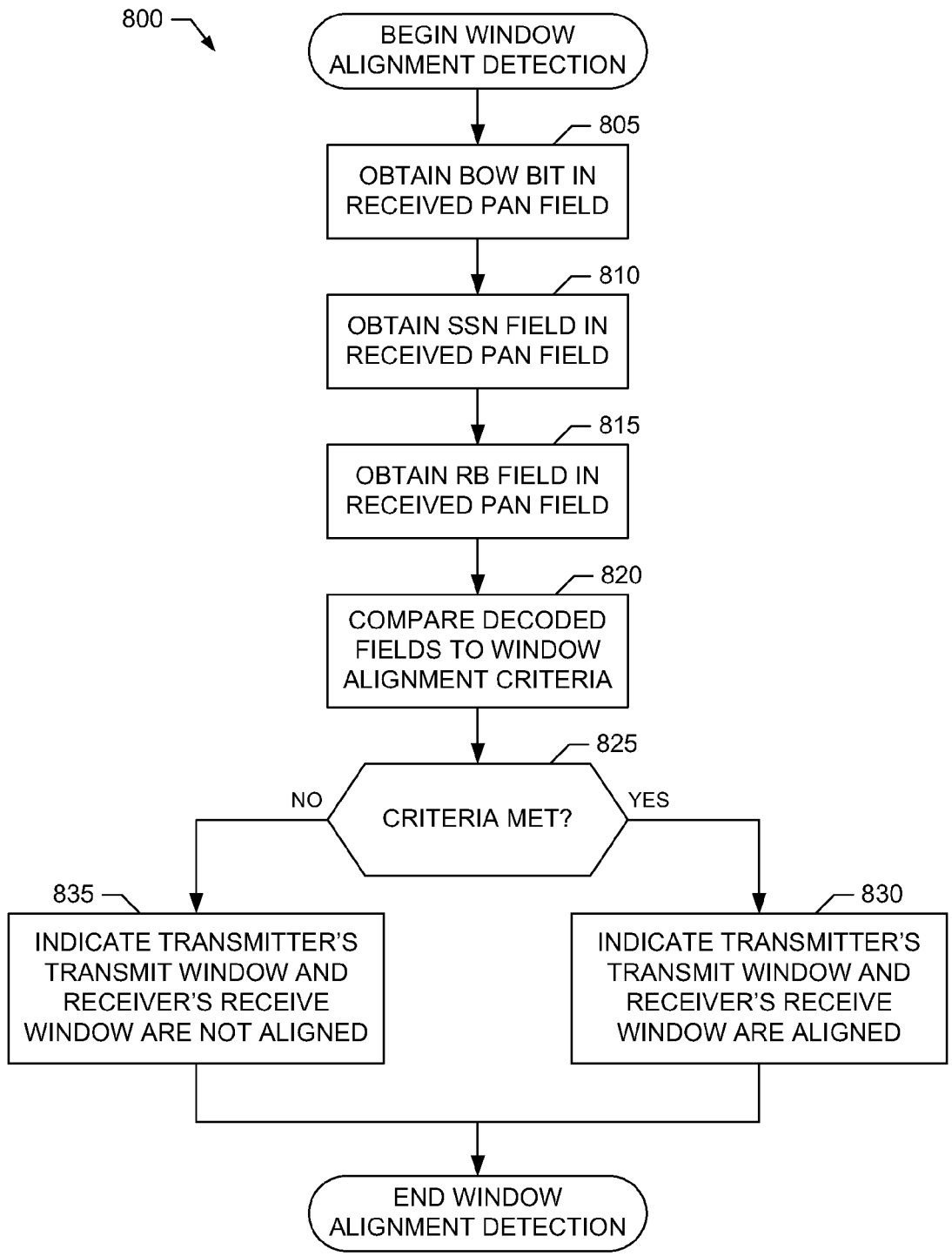

Flowcharts representative of example processes that may be executed to implement any, some or all of the example EGPRS communication system 100, the example mobile station 105, the example network element 110, the example RLC/MAC transmitter 115, the example RLC/MAC receiver 120, the example RLC/MAC transmitter 130, the example RLC/MAC receiver 135, the example PAN field decoder 405, the example acknowledge state array processor 410, the example transmit block selector 415, the example link quality estimator 420, the example RB field decoder 505, the example BOW field decoder 510, the example SSN field decoder 515 and the example window alignment detector 520 are shown in FIGS. 6-8.

In these examples, the process represented by each flowchart may be implemented by one or more programs comprising machine readable instructions for execution by: (a) a processor, such as the processor 912 shown in the example processing system 900 discussed below in connection with FIG. 9, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 912, but the entire program or programs and/or portions thereof could alternatively be executed by a device other than the processor 912 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example EGPRS communication system 100, the example mobile station 105, the example network element 110, the example RLC/MAC transmitter 115, the example RLC/MAC receiver 120, the example RLC/MAC transmitter 130, the example RLC/MAC receiver 135, the example PAN field decoder 405, the example acknowledge state array processor 410, the example transmit block selector 415, the example link quality estimator 420, the example RB field decoder 505, the example BOW field decoder 510, the example SSN field decoder 515 and the example window alignment detector 520 could be implemented by any combination of software, hardware, and/or firmware. Also, some or all of the processes represented by the flowcharts of FIGS. 6-8 may be implemented manually.

Further, although the example processes are described with reference to the flowcharts illustrated in FIGS. 6-8, many other techniques for implementing the example methods and apparatus described herein may alternatively be used. For example, with reference to the flowcharts illustrated in FIGS. 6-8, the order of execution of the blocks may be changed, and/or some of the blocks described may be changed, eliminated, combined and/or subdivided into multiple blocks.

An example process 600 that may be executed to implement acknowledgment confirmation processing based on window alignment in the example mobile unit 105 of FIG. 1 or 4, or both, is illustrated in FIG. 6. The process 600 may be executed at predetermined intervals (e.g., such as prior to a next uplink data transmission interval), based on an occurrence of a predetermined event (e.g., such as receipt of a PAN field from a network element), as a background process, etc., or any combination thereof. With reference to FIGS. 1 and 4, the process 600 of FIG. 6 begins execution at block 605 at which the PAN field decoder 405 included in the mobile station's RLC/MAC receiver 120 receives a downlink RLC/MAC data block 175 along with a PAN field 190 from the network element 110. Then, at block 610 the PAN field decoder 405 decodes the PAN field received at block 610 into its constituent RB, BOW and SSN fields as described above in connection with FIG. 5.

Next, control proceeds to block 615 at which the PAN field decoder 405 performs a window alignment detection procedure to process the decoded RB, BOW and SSN fields to determine whether the network element's receive window is aligned with the mobile station's transmit window (e.g., possibly with a relative offset). Alternatively, at block 615 the acknowledge state array processor 410 included in the mobile station's RLC/MAC transmitter 115 could perform the window alignment detection procedure at block 615. An example process for performing window alignment detection at block 615 is illustrated in FIG. 8 and described in greater detail below.

After the window alignment detection procedure is performed at block 615, control proceeds to block 620 at which the acknowledge state array processor 410 included in the mobile station's RLC/MAC transmitter 115 determines whether alignment between the network element's receive window and the mobile station's transmit window has been detected. If window alignment has not been detected (block 620), control proceeds to block 625 at which the acknowledge state array processor 410 uses any appropriate technique to use the acknowledgment information included in the decoded PAN field to update the acknowledge state array V(B) storing acknowledgment states for any previously transmitted uplink data blocks in the mobile station's current transmit window. After processing at block 625 completes, execution of the process 600 ends.

However, if alignment between the network element's receive window and the mobile station's transmit window has been detected (block 620), at block 630 the acknowledge state array processor 410 confirms the positive acknowledgment state for uplink data blocks included in the mobile station's transmission window having a TENTATIVE_ACK state by updating their respective elements in the acknowledge state array V(B) to the ACKED state (e.g., as described above in connection with FIG. 4). After processing at block 630 completes, execution of the process 600 ends.

An example process 700 that may be executed to implement transmission processing based on window alignment in the example mobile unit 105 of FIG. 1 or 4, or both, is illustrated in FIG. 7. The process 700 may be executed at predetermined intervals (e.g., such as prior to a next uplink data transmission interval), based on an occurrence of a predetermined event (e.g., such as receipt of a PAN field from a network element), as a background process, etc., or any combination thereof. With reference to FIGS. 1 and 4, the process 700 of FIG. 7 begins execution at block 705 at which the PAN field decoder 405 included in the mobile station's RLC/MAC receiver 120 receives a downlink RLC/MAC data block 175 along with a PAN field 190 from the network element 110. Then, at block 710 the PAN field decoder 405 decodes the PAN field received at block 710 into its constituent RB, BOW and SSN fields as described above in connection with FIG. 5.

Next, control proceeds to block 715 at which the PAN field decoder 405 performs a window alignment detection procedure to process the decoded RB, BOW and SSN fields from the received PAN field to determine whether the network element's receive window is aligned with the mobile station's transmit window (e.g., possibly with a relative offset). Alternatively, at block 715 the transmit block selector 415 included in the mobile station's RLC/MAC transmitter 115 could perform the window alignment detection procedure at block 715. An example process for performing window alignment detection at block 715 is illustrated in FIG. 8 and described in greater detail below.

After the window alignment detection procedure is performed at block 715, control proceeds to block 720 at which the transmit block selector 415 included in the mobile station's RLC/MAC transmitter 115 determines whether alignment between the network element's receive window and the mobile station's transmit window has been detected. If window alignment has not been detected (block 720), control proceeds to block 725 at which the transmit block selector 415 performs conventional selection of uplink data blocks for transmission by the mobile station's RLC/MAC transmitter 115. After processing at block 725 completes, execution of the process 700 ends.

However, if alignment between the network element's receive window and the mobile station's transmit window has been detected (block 720), at block 730 the transmit block selector 415 skips transmission of uplink data block(s) associated with a TENTATIVE_ACK state. Then, after processing at block 730 completes, execution of the process 700 ends.

An example process 800 that may be used to implement window alignment processing at block 615 of FIG. 6 or block 715 of FIG. 7, or both, is illustrated in FIG. 8. The process 800 is described in the context of execution by the example PAN field decoder 405. However, the process 800 could be performed additionally or alternatively by the example acknowledge state array processor 410 or the example transmit block selector 415, or both. Turning to FIG. 8, the process 800 begins at block 805 at which the PAN field decoder 405 obtains the BOW bit decoded from a received PAN field. Next, at block 810 the PAN field decoder 405 obtains the SSN field decoded from the received PAN field. Next, at block 815 the PAN field decoder 405 obtains the RB field decoded from the received PAN field.

Then, at block 820 the PAN field decoder 405 compares the obtained BOW, SSN and RB information to window alignment criteria to determine whether the network element's receive window (as indicated by the received PAN field) is aligned with the mobile station's transmit window (e.g., possibly with a relative offset). For example, at block 820 the PAN field decoder 405 determines whether (1) the BOW bit is set, (2) the SSN corresponds to the BSN of the send state variable, V(S), of the transmit window, thereby indicating that the start of the network element's receive window is pointing to the next new uplink data block to be sent in the mobile station's transmit window, and (3) the RB bits indicate that no subsequent uplink data blocks have been received by the network element.

Figure 9:
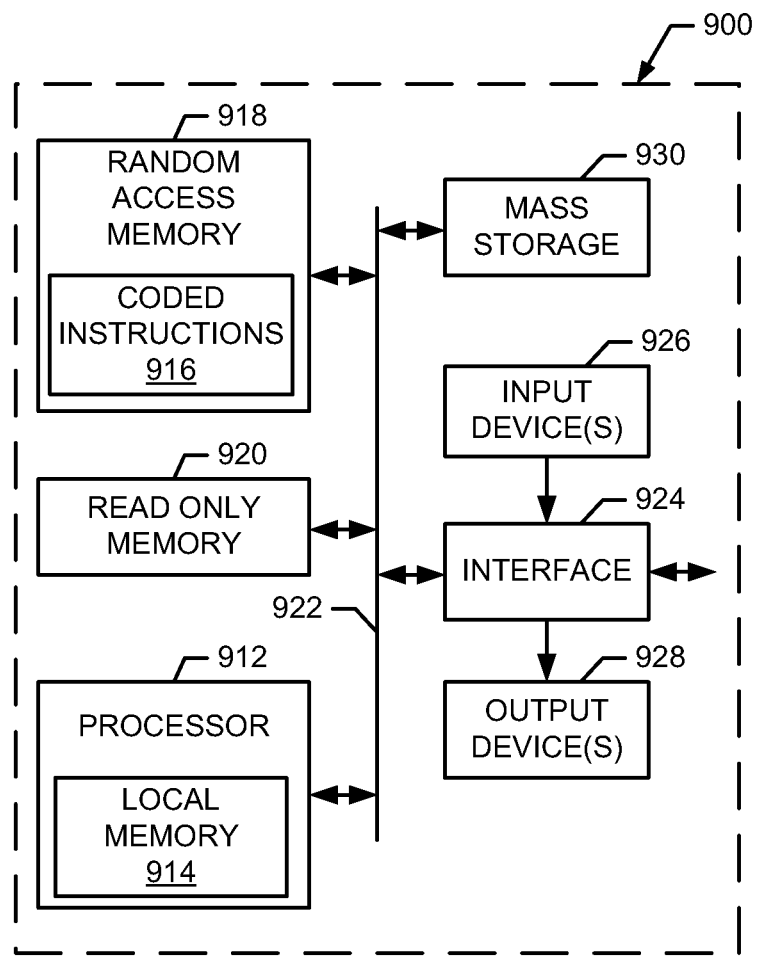

After the comparison at block 820 is performed, control proceeds to block 825 at which the PAN field decoder 405 determines whether the window alignment criteria have been met by the obtained BOW, SSN and RB information. If the window alignment criteria have been met (block 825), control proceeds to block 830 at which the PAN field decoder 405 indicates that the network element's receive window and the mobile station's transmit window are aligned. However, if the window alignment criteria have not been met (block 825), control proceeds to block 835 at which the PAN field decoder 405 indicates that the network element's receive window and the mobile station's transmit window are not aligned. Execution of the process 800 then ends FIG. 9 is a block diagram of an example processing system 900 capable of implementing the apparatus and methods disclosed herein. The processing system 900 can correspond to, for example, a mobile station processing platform, a network element processing platform, a server, a personal computer, a personal digital assistant (PDA), an Internet appliance, a mobile phone, or any other type of computing device.

The system 900 of the instant example includes a processor 912 such as a general purpose programmable processor, an embedded processor, a microcontroller, etc. The processor 912 includes a local memory 914, and executes coded instructions 916 present in the local memory 914 and/or in another memory device. The processor 912 may execute, among other things, machine readable instructions to implement the processes represented in FIGS. 6-8. The processor 912 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PICO family of microcontrollers, etc. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The computer 900 also includes an interface circuit 924. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The computer 900 also includes one or more mass storage devices 930 for storing software and data. Examples of such mass storage devices 930 include floppy disk drives, hard drive disks, compact disk drives and digital versatile disk (DVD) drives. The mass storage device 930 may store the acknowledge state array V(B) processed by the acknowledge state array processor 410. Alternatively, the volatile memory 918 may store the acknowledge state array V(B) processed by the acknowledge state array processor 410.

As an alternative to implementing the methods and/or apparatus described herein in a system such as the device of FIG. 9, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for communication comprising:
receiving acknowledgment information piggy-backed with data after a first previously transmitted block has been associated with at least one of a tentative acknowledgment state or a pending acknowledgment state; and
in response to receiving the acknowledgment information piggy-backed with data, advancing a transmit window when the acknowledgment information piggy-backed with data has been determined to indicate that all previously transmitted data blocks including the first previously transmitted block have been positively acknowledged, wherein the acknowledgment information piggy-backed with data is an enhanced general packet radio service (EGPRS) piggy-backed ACK/NACK (PAN) field comprising a starting sequence number, and the PAN field indicates that all previously transmitted data blocks including the first previously transmitted block have been positively acknowledged when a start of a receive window identified by the starting sequence number aligns with a next new block to be transmitted.

2. A method as defined in claim 1 further comprising associating the first previously transmitted block with a positive acknowledgment state.

3. A method as defined in claim 1 wherein the PAN field further comprises a beginning of window indicator, and the beginning of window indicator indicates that the starting sequence number identifies the start of the receive window.

4. A method as defined in claim 3 wherein the PAN field does not positively acknowledge any data blocks that have not been previously transmitted.

5. A method as defined in claim 1 further comprising skipping retransmission of the first previously transmitted block when the acknowledgment information indicates that all previously transmitted data blocks including the first previously transmitted block have been positively acknowledged.

6. A method as defined in claim 1 wherein, when the transmit window is advanced, no elements of a state array storing acknowledgment status of previously transmitted blocks fall within the transmit window.

7. A method as defined in claim 1 wherein an element of a state array storing acknowledgment status of the first previously transmitted block was within the transmit window before the acknowledgment information was received.

8. A tangible machine readable storage device or storage disk comprising machine readable instructions which, when executed, cause a machine to at least:
receive acknowledgment information piggy-backed with data after a first previously transmitted block has been associated with at least one of a tentative acknowledgment state or a pending acknowledgment state; and
advance a transmit window in response to receipt of the acknowledgment information piggy-backed with data when the acknowledgment information piggy-backed with data has been determined to indicate that all previously transmitted data blocks including the first previously transmitted block have been positively acknowledged, wherein the acknowledgment information piggy-backed with data is an enhanced general packet radio service (EGPRS) piggy-backed ACK/NACK (PAN) field comprising a starting sequence number, and the PAN field indicates that all previously transmitted data blocks including the first previously transmitted block have been positively acknowledged when a start of a receive window identified by the starting sequence number aligns with a next new block to be transmitted.

9. A tangible storage device or storage disk as defined in claim 8 wherein the PAN field further comprises a beginning of window indicator, and the beginning of window indicator indicates that the starting sequence number identifies the start of the receive window.

10. A tangible storage device or storage disk as defined in claim 8 wherein the machine readable instructions, when executed, further cause the machine to skip retransmission of the first previously transmitted block when the acknowledgment information indicates that all previously transmitted data blocks including the first previously transmitted block have been positively acknowledged.

11. A tangible storage device or storage disk as defined in claim 8 wherein, when the transmit window is advanced, no elements of a state array storing acknowledgment status of previously transmitted blocks fall within the transmit window.

12. A tangible storage device or storage disk as defined in claim 8 wherein an element of a state array storing acknowledgment status of the first previously transmitted block was within the transmit window before the acknowledgment information was received.

13. A communication apparatus comprising:
a receiver to receive acknowledgment information piggy-backed with data after a first previously transmitted block has been associated with at least one of a tentative acknowledgment state or a pending acknowledgment state; and
a transmitter to advance a transmit window in response to receipt of the acknowledgment information piggy-backed with data when the acknowledgment information piggy-backed with data has been determined to indicate that all previously transmitted data blocks including the first previously transmitted block have been positively acknowledged, wherein the acknowledgment information piggy-backed with data is an enhanced general packet radio service (EGPRS) piggy-backed ACK/NACK (PAN) field comprising a starting sequence number, and the PAN field indicates that all previously transmitted data blocks including the first previously transmitted block have been positively acknowledged when a start of a receive window identified by the starting sequence number aligns with a next new block to be transmitted.

14. An apparatus as defined in claim 13 wherein the transmitter is to also associate the first previously transmitted block with a positive acknowledgment state when the acknowledgment information received by the receiver indicates that all previously transmitted data blocks including the first previously transmitted block have been positively acknowledged.

15. An apparatus as defined in claim 13 wherein the PAN field further comprises a beginning of window indicator, and the beginning of window indicator indicates that the starting sequence number identifies the start of the receive window.

16. An apparatus as defined in claim 13 wherein the transmitter is to skip retransmission of the first previously transmitted block when the acknowledgment information indicates that all previously transmitted data blocks including the first previously transmitted block have been positively acknowledged.

17. An apparatus as defined in claim 13 further comprising a state array to store acknowledgment status of previously transmitted blocks, and wherein when the transmitter advances the transmit window, no elements of the state array storing the acknowledgment status of the previously transmitted blocks fall within the transmit window.

18. An apparatus as defined in claim 13 further comprising a state array to store acknowledgment status of previously transmitted blocks, and wherein an element of the state array storing acknowledgment status of the first previously transmitted block was within the transmit window before the receiver received the acknowledgment information.

\* \* \* \* \*